Feb. 20, 1962   F. W. TANNER, JR., ETAL   3,022,347
ANTIBIOTICS AND PROCESSES
Filed March 28, 1960   2 Sheets—Sheet 2
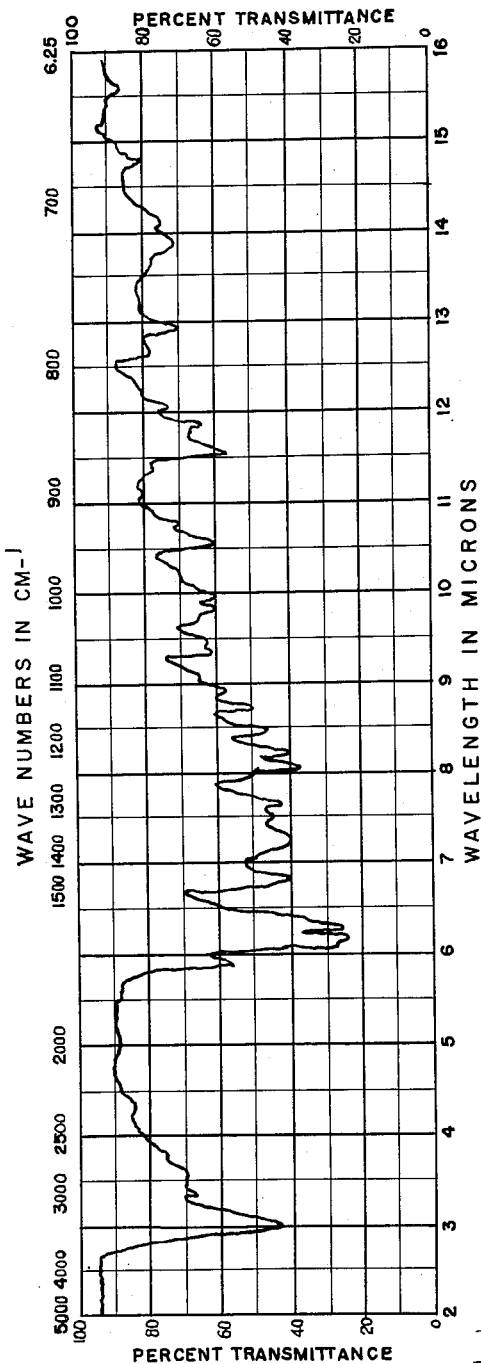
FIG. II.
INFRARED ABSORPTION SPECTRUM OF P.A. 7478 HYDROCHLORIDE
INVENTORS
Fred W. Tanner, Jr.
Francis A. Hochstein
Kotaro Murai
BY
Connolly and Hutz
ATTORNEYS

United States Patent Office 3,022,347
Patented Feb. 20, 1962

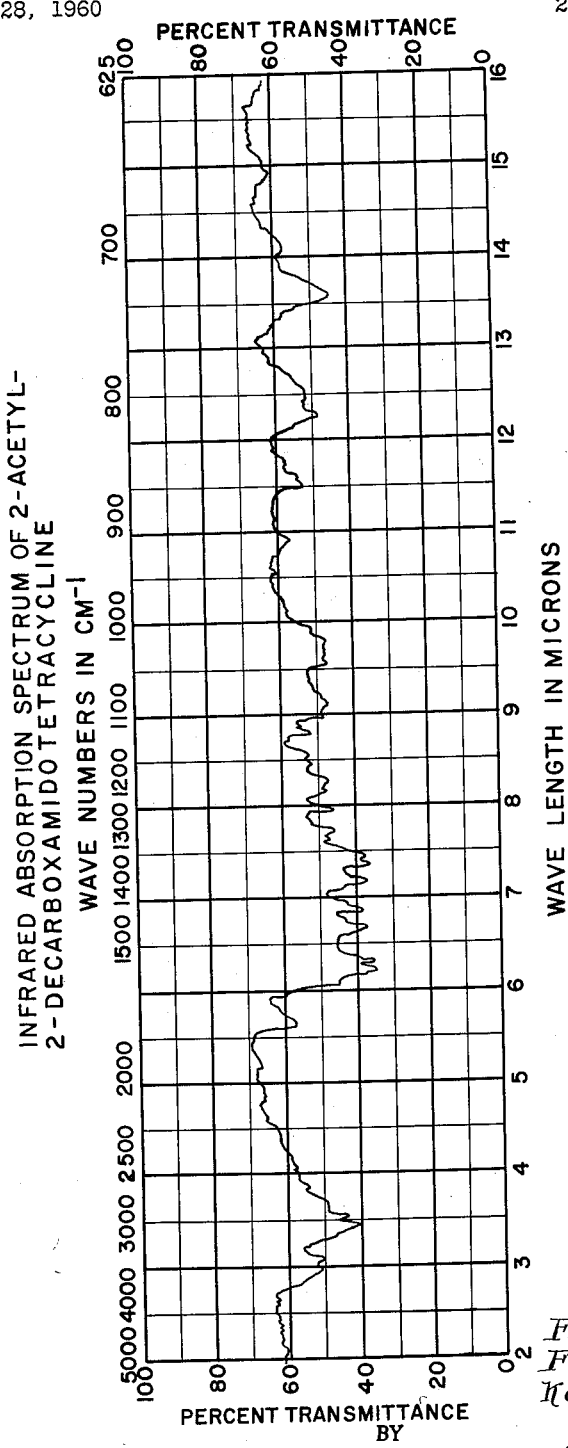

3,022,347
ANTIBIOTICS AND PROCESSES
Fred W. Tanner, Jr., Gales Ferry, Francis A. Hochstein, New London, and Kotaro Murai, Groton, Conn., assignors to Chas. Pfizer & Co., Inc., New York, N.Y., a corporation of Delaware
Filed Mar. 28, 1960, Ser. No. 17,851
6 Claims. (Cl. 260—571)

This invention is concerned with new and useful antimicrobial agents, as crude concentrates and in purified forms, and with fermentation processes for their production. More particularly it is concerned with novel tetracycline antibiotics, with methods for their production by mutated species of Streptomyces organisms, and with methods for the recovery, concentration and purification of these antibiotics from crude solutions including the fermentation broths. This application is a continuation-in-part of abandoned application Serial No. 763,647 filed September 26, 1958, which was in turn a continuation-in-part of application Serial No. 755,426, now abandoned.

The new antibiotics are amphoteric substances of the following formula:

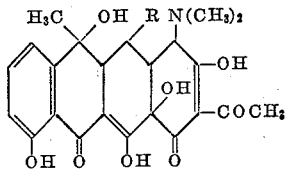

where R may be either hydrogen or hydroxyl. These are tetracycline antibiotics possessing in the 2-position an acetyl group in place of a carboxamido group. Accordingly, the substance corresponding to R=H is designated 2-acetyl-2-decarboxamidotetracycline, and the one corresponding to R=OH is designated 2-acetyl-2-decarboxamidooxytetracycline.

2-acetyl-2-decarboxamidooxytetracycline is formed during the cultivation under controlled conditions of a mutant of Streptomyces rimosus which is identified by planting and testing cultures thereof on media normally used for the identification of such microorganisms and by observing the growth and/or changes which occur incident thereto. A number of mutants of S. rimosus are found to produce the new antibiotic in varying yields. One such mutant, in particular, is found to produce the antibiotic in excellent yields. A living culture of this S. rimosus mutant has been deposited with the American Type Culture Collection in Washington, D.C. and added to its collection of microorganisms as ATCC No. 13224. The mutant of S. rimosus keys out with S. rimosus when tested on various standard media normally used in the identification of this organism. Mutants of S. rimosus may be prepared by standard procedures well known in the art. These methods generally involve treatment of S. rimosus with X-radiation, ultraviolet radiation, nitrogen mustards and the like.

The cultivation of S. rimosus in standard nutrient media is known in the prior art to produce oxytetracycline. The new antibiotics of the present invention share with oxytetracycline and other antibiotics produce by Streptomyces in the property of having a wide antibiotic spectrum, particularly among the Gram negative bacteria.

Table I illustrates the activity of 2-acetyl-2-decarboxamidooxytetracycline against a group of microorganisms which cause various diseases. The tests were carried out by the serial dilution technique. According to this technique a nutrient medium was prepared containing the antibiotic at a concentration of 100 mcg./ml. Aliquots of this media were next diluted with varied volumes of water so that tubes containing the antibiotic at a concentration of 100, 50, 25, 12.5, 6.25, 3.12, 1.56, 0.78, 0.39 and 0.19 mcg./ml. were obtained. These tubes were then inoculated with the test organism and incubated to determine the extent to which the microorganism grows in the presence of antibacterial agent. In this fashion, the minimum inhibitory concentrations of 2-acetyl-2-decarboxamidooxytetracycline were determined. These are recorded, together with the antimicrobial activity of oxytetracycline, in the following table.

TABLE I

Antimicrobial activity in vitro—2-acetyl-2-decarboxamidooxytetracycline

| Microorganism | 2-Acetyl-2-Decarboxamido-oxytetracycline MIC (mcg./ml.) | Oxytetracycline |
|---|---|---|
| Micrococcus pyogenes var. aureus | 6.25 pi | 1.0 |
| Streptococcus pyogenes | 6.25 | |
| Streptococcus faecalis | 6.25 | |
| Diplococcus pneumoniae | 12.5 | |
| Erysipelothrix rhusiopathiae | 12.5 | |
| Corynebacterium diphtheriae | 25 pi | |
| Listeria monocytogenes | 25 | |
| Bacillus subtilis | 1.56 pi | 3 |
| Clostridium perfringens | 1.56 | |
| Bacterium ammoniagenes | 12.5 | |
| Hemophilus influenzae | 6.25 | |
| Desulfovibrio desulfuricans | 12.5 | |
| Vibrio comma | 6.25 | |
| Pasteurella multocida | 12.5 | |
| Proteus vulgaris | 100 | 1,000 |
| Salmonella typhosa | 100 | |
| Salmonella pullorum | 50 | 10 |
| Klebsiella pneumoniae | 50 | 3 |
| Streptococcus agalactiae | 1.56 | |
| Lactobacillus casei | 12.5 pi | |
| Aerbacter aerogenes | 50 | |
| Escherichia coli | 50 | |
| Salmonella gallinarum | 100 | |
| Nesseria gonnorheae | 25 | |
| Shigella sonnei | 50 | |
| Erwinia amylovora | 50 | |
| Brucella bronchiseptica | 50 | |
| Malleomyces mallei | 200 | |
| Phytomonas phasiocolica | 50 | |
| Xanthomonas vasinfectia | 50 | |
| Mycobacterium 607 | 3.12 | |
| Mycobacterium berolinense | 1.56 | |
| Pityrosporum ovale Traub | 50 | |

This invention embraces a process for growing the new mutant of S. rimosus, preferably at 24–30° C. under submerged conditions of agitation and aeration, on media consisting of a carbohydrate source, such as sugars, starch, glycerol; an organic nitrogen source, such as soybean meal, wheat gluten, cottonseed meal, lactalbumin, an enzymatic digest of casein, tryptone; a source of growth substances, such as distillers' solubles, yeast extract; mineral salts, such as sodium chloride, potassium phosphate, magnesium sulphate, sodium nitrate; a buffering agent, such as calcium carbonate; and vegetable oil. After growth has been completed, the mycelium is separated from the broth now containing 2-acetyl-2-decarboxamidooxytetracycline, and the antibiotic is recovered from the broth by means of extraction with organic solvents at a suitable pH, or by adsorbing the antibiotic from the broth onto activated carbon and eluting it from the carbon by means of organic solvents or water at a suitable pH, or by other means well known to the art. The new antibiotic, 2-acetyl-2-decarboxamidooxytetracycline, produced as aforesaid, possesses unique and valuable properties which distinguish it from all known and previously described antibiotics.

Inoculum may be obtained by employing a growth from slants or Roux bottles inoculated with S. rimosus mutant. Solid media suitable for this initial growth are beef lactose or Emerson's agar. This growth is used to inoculate either shaken flasks or submerged inoculum tanks; or alternatively, the inoculum tanks are inoculated from the shaken flasks. Any shaken flask growth will generally have reached its maximum in 4 days, whereas inoculum in submerged inoculum tanks will usually be at the most favorable period in 2 days. From the inoculum tank the broth containing the microorganism is forced into the fermenter under completely aseptic conditions, and growth is continued for a further period of from 2 to 5 days. At all times aeration is maintained in the tanks by blowing in sterile air through a sparger at the rate of ¼–2 volumes of free air per volume of broth per minute. If difficulty is experienced in preventing the rise of the foam within the tank, antifoaming agents, such as vegetable or animal oils, or other similar agents may be added to break up the foam. While the broth is agitated at a speed depending upon the type of agitator, completely aseptic conditions are maintained and the temperature of the agitated broth is maintained between 24–30° C.

2-acetyl-2-decarboxamidooxytetracycline may be recovered from the fermentation broth in which it is formed by several different procedures. The mycelium in the fermentation broth must first be removed, and it has been found that this is best done by making the mixture acid, preferably below pH 4, and the filtering out the mycelium. If this pH adjustment is not made, part of the antibiotic is left on the mycelium.

2-acetyl-2-decarboxamidooxytetracycline may be recovered in a purified form by extracting the filtered fermentation broth with certain solvents at a basic pH, preferably about eight or higher. The antibiotic may also be effectively extracted at acidic pH but the extraction process may be less selective. The solvents that may be used include butanol, amyl alcohol, ethyl acetate, and the like. Usually it is found that extraction with an equal volume of butanol is particularly effective. It is often convenient to use two extractions, each with the volume of solvent being about ½ the total volume of broth. Various equipment such as separatory funnels, stirred tanks, and mechanical extracting devices such as centrifugal separators are helpful during the extractions.

One procedure which is satisfactory for obtaining an amorphous solid concentrate of the 2-acetyl-2-decarboxamidooxytetracycline involves solvent extraction of the filtered broth with butanol at pH 9.5–10, acidification of the butanol solution to pH 5.5 with 10% dilute acetic acid, concentration, preferably under reduced pressure, of the extract to $\frac{1}{10}$ to $\frac{1}{50}$ of the original volume and addition of a non-solvent such as hexane followed by extraction of the butanol-hexane mixture with dilute hydrochloride acid, preferably by several extractions with approximately ¼ volume of dilute acid. The antibiotic is obtained from the acid extract by precipitation as the barium-magnesium complex by the addition of a mixture of barium chloride and magnesium chloride in water followed by adjustment of the pH to 8.5 with sodium hydroxide. The antibiotic is obtained from the barium-magnesium complex by treatment with aqueous sulphuric acid at about pH 2, filtration, pH adjustment to 5, followed by filtration and adjusting the pH to 7 at which point the antibiotic precipitates. Since the antibiotic as precipitated at this stage is found to be relatively insoluble in methanol it may be leached several times with this solvent. The precipitate filtered at pH 5 is found to have appreciable antibiotic activity. The crude antibiotic may be further purified by countercurrent distribution between suitable solvent pairs.

The potency of the product as obtained may be determined by standard procedures well known in the art. For example, the potency of the antibiotic is determined by standard plate assay employing an organism such as *B. cereus* or *B. subtilis*. When tested against *B. cereus* the product obtained assayed at about 45 to 55 units of oxytetracycline per mgm. and was used for most of the herein described studies.

Although the new antibiotics of this invention are somewhat similar to their corresponding 2-carboxamido analogues, they differ considerably in many aspects, for example, in effective antibiotic spectrum and physical properties. Thus, the chromatograms of 2-acetyl-2-carboxamidooxytetracycline developed with various solvent systems demonstrate significant difference from those of oxytetracycline or tetracycline. In a solvent system comprising chloroform (10), nitromethane (20) and pyridine (3) as the developing solvent on Whatman No. 1 paper previously impregnated with a phosphate-citrate buffer at pH 3.5, 2-acetyl-2-decarboxamidooxytetracycline gave Rf values equal to 0.1 to 0.2, which is considerably slower than oxytetracycline or tetracycline. On the other hand, 2-acetyl-2-decarboxamidooxytetracycline is considerably faster than oxytetracycline or tetracycline on a paper chromatographic system which uses ethyl acetate (200), n-butyl alcohol (20) and water (20) as the developing solvent on Whatman No. 1 paper previously impregnated with potassium phosphate-phosphoric acid buffer at pH 3, showing an Rf value of 0.6–0.8. As employed herein, the numbers in parentheses after each solvent refer to parts by volume. 2-acetyl-2-decarboxamidooxytetracycline is further differentiated from oxytetracycline and tetracycline by its distribution coefficients in various solvent pairs and also by its ultraviolet absorption as described herein.

When partially purified concentrates of 2-acetyl-2-decarboxamidooxytetracycline from *S. rimosus* ATCC 13224 fermentation are subjected to paper chromatography they are found to contain several additional components, in particular, a substance designated Component 2. For example, employing a paper chromatographic system consisting of nitromethane (20), chloroform (10), butanol (5) and pyridine (3) as the developing solvent on Whatman 3MM paper previously impregnated with pH 3.5 MacIlvaine buffer (100 cc. 0.2 M $Na_2HPO_4$ and 200 cc. 0.1 M citric acid) several components can be separated from the concentrated butanol extract of filtered *S. rimosus* ATCC 13224 fermentation broth. If 1 ml. of a solution having a solids concentration of 10 mg. per ml. is placed on this relatively heavy, slow paper and developed for 48 hours Component 2 separates as a spot (white to yellow fluorescent under ultraviolet light) having an Rf slightly greater than that of 2-acetyl-2-decarboxamidooxytetracycline. In addition, a spot exhibiting blue fluorescence and one exhibiting yellow fluorescence under ultraviolet light are also distinguishable. Both of the components corresponding to these two spots have Rf values somewhat lower than 2-acetyl-2-decarboxamidooxytetracycline, in this system.

Component 2 also exhibits a higher Rf value than 2-acetyl-2-decarboxamidooxytetracycline in the system employing nitromethane (20), chloroform (10) and pyridine (3) as the developing solvent on paper impregnated with pH 3.5 MacIlvaine buffer. In the system which employs acetone (9), toluene (2), and 2% aqueous calcium acetate (1) (the mixture filtered before use) as the developing solvent on Whatman No. 4 paper previously impregnated with a 2% solution of calcium acetate in 80% aqueous methanol and air-dried before use, Component 2 appears as a leading cap on the 2-acetyl-2-decarboxamidooxytetracycline zone.

As hereinafter noted, these data indicate that Component 2 is 2-acetyl-2-decarboxamidotetracycline. This new antibiotic is more readily prepared during the cultivation under controlled conditions of certain mutants of *Streptomyces aureofaciens*. A living culture of one such mutant, classified by planting and testing cultures thereof on media normally used for the identification of such microorganisms and by observing the growth and/or changes which occur incident thereto, has been deposited with the American Type Culture Collection in Washington, D.C. and added to its collection of microorganisms as ATCC No. 13749. Mutants of *S. aureofaciens* may be prepared by well known procedures, such as treatment of *S. aureofaciens* with X-radiation, ultraviolet radiation, nitrogen mustards and the like.

2-acetyl-2-dicarboxamidotetracycline possesses unique and valuable properties which distinguish it from all known and previously described antibiotics. It exhibits in vitro antimicrobial activity against a variety of both Gram positive and Gram negative organisms, including the following:

Minimum inhibitory concentration (mcg./ml.)

Streptococcus pyogenes _____ 100
Corynebacterium diphtheriae _____pi__ 100
Bacillus subtilis _____ 50
Neisseria gonorrhoeae _____ 100
Brucella bronchiseptica _____ 100
Pasteurella multocida _____ 100 pi=partial inhibition.

This invention embraces a process for growing the new mutant of S. aureofaciens, preferably at 24–30° C. under submerged conditions of agitation and aeration, on media consisting of a carbohydrate source, such as a sugar, starch, or glycerol; a nitrogen source, such as corn steep liquor, soybean meal, or an enzymatic digest of casein, to which may be added inorganic nitrogen sources such as ammonium salts; as well as mineral salts, such as magnesium salts and trace metals such as iron, manganese, zinc and cobalt, which are often found as impurities in the other constituents. These may also be added to the nutrient medium in the form of sulfates or other soluble salts. The pH of the medium is preferably adjusted to from about 6 to 7 at the start, and it will usually be found to drop below 6 as fermentation progresses.

Inoculum may be prepared with the same media, employing an S. aureofaciens growth from agar slants. After the inoculum fermentation has proceeded for about two days the broth is transferred to the fermenter under aseptic conditions and growth is continued for a further period of about 5 days. The tanks are aerated at all times by introducing sterile air through a sparger at the rate of about ¼ to 2 volumes of free air per volume of broth per minute. Antifoam agents, such as silicone oil or vegetable oil, may be incorporated if foaming is excessive.

2-acetyl-2-decarboxamidotetracycline may be recovered from the filtered fermentation broth by a variety of procedures, such as those described hereinabove as suitable for recovery of 2-acetyl-2-decarboxamidooxytetracycline. For example, the new antibiotic may be isolated by extraction from the fermentation broth into an organic solvent, or by adsorption onto activated carbon followed by elution. Extraction with a solvent such as butanol or methyl isobutyl ketone is most efficiently conducted at a pH above 8 or below 4, preferably at a pH of about 8 to 9 or 2 to 4. However, it is also possible to extract the antibiotic successfully at the intermediate pH values near or at neutrality. About one volume of solvent per volume of broth is appropriate, and this may be suitably employed in divided portions in a series of batchwise extractions, or in countercurrent extraction by Podbielniak machine.

Further purification of the isolated antibiotic may be effected by the procedures described above as being suitable for 2-acetyl-2-decarboxamidooxytetracycline purification. Purification may also be achieved by the following sequence of steps: concentration of the solvent extract, precipitation of solid antibiotic by addition of a non-solvent such as ether, solution in aqueous acid buffer solution at about pH 3.5, followed by partition chromatography against a solvent system such as nitromethane (20), chloroform (10), pyridine (3). Partition chromatography may be carried out on a column packed with cellulose, such as Whatman ashless chromatographic cellulose powder. The aqueous column effluent is collected in a series of fractions which are assayed, suitably by paper chromatography, and those containing appreciable concentrations of the desired antibiotic are combined to form a production fraction. This solution is then concentrated and the product precipitates in the form of a reddish solid which proves to be more than half crystalline when examined under the polarizing microscope. The product, tested in a standard tetracycline turbidity assay vs. K. pneumoniae, assays 13 units per milligram.

Further purification may be effected by solvent distribution or a second cellulose column chromatography step. The infrared absorption spectrum of the purified product (1% in KBr) is given in FIG. 1. A variety of test results, hereinafter described, are all consistent with the assignment of 2-acetyl-2-decarboxamidotetracycline free base as the structure of this product. Tests further indicate the identy of the new antibiotic and the previously described Component 2 of the 2-acetyl-2-decarboxamidooxytetracycline fermentation.

The ultraviolet absorption spectra of this new antibiotic in methanolic hydrogen chloride and in methanolic sodium hydroxide closely resemble the spectra of 2-acetyl-2-decarboxamidooxytetracycline:

PEAK WAVELENGTHS

| S. aureofaciens fermentation isolate | | 2-Acetyl-2-decarboxamidooxytetracycline | |
|---|---|---|---|
| 0.01 N HCl | 0.01 N NaOH | 0.01 N HCl. m$\mu$ | 0.01 N NaOH, m$\mu$ |
| m$\mu$ $E_{1\,cm.}^{1\%}$=313 220 | | 220 | |
| 276    243 358    179 | 378 $E_{1\,cm.}^{1\%}$=242 | 277 355 | 375 |

However, when the new antibiotic is heated in aqueous hydrochloric acid its ultraviolet absorption spectrum is transformed to one typical of an anhydrotetracycline, indicating that it does not contain the 5-hydroxy group which is present in 2-acetyl-2-decarboxamidooxytetracycline:

PEAK WAVELENGTHS

| S. aureofaciens fermentation isolate,[1] m$\mu$ | Anhydrotetracycline, m$\mu$ |
|---|---|
| 210 | 224 |
| 273 | 270 |
| 428 | 430 |

[1] After heating a 0.01% solution in 1 N aqueous hydrochloric acid in a boiling water bath for 8 minutes and then diluting to 10 volumes with water.

The new antibiotic, isolated from the S. aureofaciens fermentation and purified as described, may readily be distinguished from previously known tetracycline antibiotics, including tetracycline, oxytetracycline, chlortetracycline, 6-deoxytetracycline, 6 - demethyltetracycline, 6 - demethylchlortetracycline, and anhydrochlortetracycline by differences in R$f$ value as determined by paper chromatography with various solvent systems. Its spot on the paper chromatograms is characterized by a strong yellow fluorescence under ultraviolet light and by activity against K. pneumoniae when the paper is placed in contact with inoculated agar. Paper chromatography of crude isolates from the S. aureofaciens fermentation show that several additional substances are produced by this fermentation, including both more polar and less polar substances. However, upon further purification as described, paper chromatograms show only one spot, corresponding to the product identified as 2-acetyl-2-decarboxamidotetracycline. Approximate R$f$ values of this substance in several solvent systems are given below, together with comparative values for 2-acetyl-2-decarboxamidooxytetracycline. In each case the paper is impregnated with pH 3.5 MacIlvaine buffer.

TABLE II

| Solvent System | Mobile Phase | Estimated Rf Values | |
|---|---|---|---|
| | | S. aureofaciens fermentation isolate | 2-Acetyl-2-decarboxamidooxytetracycline |
| A | nitromethane (20), toluene (10), butanol (5), pyridine (3) | 0.5 | 0.3 |
| B | ethyl acetate saturated with water | 0.05 | 0.1 |
| C | nitromethane (20), chloroform (10), pyridine (3) | 0.23 | 0.15 |

In solvent systems A and C the S. aureofaciens fermentation isolate has a higher Rf value than 2-acetyl-2-decarboxamidooxytetracycline, while in solvent system B the relationship is reversed. In these respects the S. aureofaciens fermentation isolate and the 2-acetyl-2-decarboxamidooxytetracycline correspond in their relative behavior to tetracycline and oxytetracycline, respectively.

The evidence presented above all indicates that the antibiotic isolated from the S. aureofaciens fermentation and purified as described is 2-acetyl-2-decarboxamidotetracycline. The further identity of this substance with Component 2 of the S. rimosus fermentation is indicated by their parallel behavior when the concentrated butanol extract of filtered S. rimosus ATCC 13224 fermentation broth is subjected to paper chromatography employing the solvent systems of the preceding table.

The novel antibiotics of this invention as may be seen from the described data are of great value in the treatment of various infections in humans and animals. They may be administered by parenteral injection, orally or topically in customary dosage forms. For example, they may be used for oral administration in powdered form, as in capsules and tablets or in suspensions in aqueous liquids or edible oils such as sesame oil, peanut oil and the like. Solutions of the antibiotics, as the amphoteric substances or in the form of soluble salts, may be employed for parenteral administration. 2-acetyl-2-decarboxamidooxytetracycline is found to be non-lethal to mice at a concentration of 400 mgm./kg. of body weight when administered by the oral, subcutaneous or intravenous routes. This antibiotic is found to protect mice against M. pyogenes var. aureus, oral $ED_{50}$ about 140 mg./kg. The antibiotic can be detected in the urine of mice following intravenous injection.

In addition, the new antibiotics are useful in separating and classifying mixtures of microorganisms for biological research and medical diagnostic purposes. They are also valuable intermediates in the preparation of other novel tetracycline-type compounds. They may, for example, be converted to the corresponding 6-deoxy tetracyclines by hydrogenolysis, suitably by treatment in glacial acetic acid with hydrogen at moderate pressures (e.g. about 1500 p.s.i.g.) in the presence of a catalyst such as 5% palladium on carbon as described in co-pending application Serial No. 841,928, filed September 24, 1959, and assigned to the same assignee as the present invention. Such transformations often result in products of improved biological activity and stability.

The following examples are provided for illustrative purposes and should not be construed as limiting the invention, many variations of which are possible without departing from the spirit or scope thereof. In the production of the new antibiotics, the invention embraces not only the specific microorganisms described but mutants thereof as produced by various known means such as X-radiation, ultraviolet radiation and the like.

*Example I*

The following medium was prepared:

| | g./l. |
|---|---|
| Soybean meal | 10 |
| Cerelose (glucose hydrate) | 10 |
| Distillers' solubles | 0.5 |
| NaCl | 5 |

The pH was adjusted to 7.0 with NaOH and $CaCO_3$ was added at the rate of 1 g./l. Five hundred milliliter portions of the above medium were added to Fernbach flasks which were then sterilized at 120° C. for 30 minutes. After cooling, the flasks were inoculated with a suspension of the growth of S. rimosus, ATCC No. 13224 obtained from the surface of beef lactose agar slants and the flasks shaken for 4 days at 28° C. on a rotary shaker. At the end of this period, the mycelium was separated from the broth which assayed at twenty oxytetracycline units per milliliter (150 mg. 2-acetyl-2-decarboxamidooxytetracycline per liter) by filtration after the latter was adjusted to pH 2.0 with sulfuric acid. The filtrate was then adjusted to pH 9.5 and immediately extracted with an equal volume of butanol. The butanol extract was adjusted to pH 5.5 with 10% aqueous acetic acid and concentrated to one-tenth its volume at a temperature of 40° C. (Water may be added if desired at the earlier stages of concentration). Two volumes of hexane were then added to the concentrated butanol extract and the mixture extracted with three ¼ volumes of 0.05 N HCl. One liter of the acid extract was then treated with 30 ml. of a solution prepared by dissolving 342 g. $BaCl_2 \cdot 2H_2O$ and 46 g. $MgCl_2 \cdot 6H_2O$ in 950 ml. of water. The mixture was adjusted to pH 8.5 with 10% NaOH. The white precipitate thus produced was allowed to flocculate and was filtered and washed with water. The barium-magnesium complex was then suspended in water and sulfuric acid added to pH 2. After filtering, the aqueous solution is first adjusted to pH 5 and filtered, and then to pH 7 where 2-acetyl-2-decarboxamidooxytetracycline precipitated. The yellow-tan antibiotic after filtering, drying in vacuo and leaching twice with 10–20 volumes of methanol assayed at 45–55 oxytetracycline units/mg. (B. cereus plate assay). Paper chromatograms of the antibiotic were developed on various systems as indicated below with the corresponding Rf values:

| Rf Value | System |
|---|---|
| 0.1 to 0.2 | $CHCl_3$(10), $CH_3NO_2$(20) and pyridine (3) as developing solvent on Whatman No. 1 paper impregnated with phosphate-citrate buffer at pH 3.5 and dried before use. |
| 0.6–0.8 | Ethyl acetate (200), n-butyl alcohol (20) and water (20) as developing solvent on Whatman No. 1 paper previously impregnated with potassium phosphate-phosphoric acid buffer at pH 3 and dried. |

Whatman No. 1 paper employed in the above description is well known and generally employed in this art. This paper is generally used for ordinary work, retaining medium size particles for qualitative and rough quantitative work. The average ash of a 2.5 cm. sheet of this paper is 0.00075 mg. 2-acetyl-2-decarboxamidooxytetracycline can be detected by its (yellow) characteristic fluorescence under ultraviolet light and by bioautographic techniques, using an agar plate seeded with a susceptible organism (e.g. B. subtilis). This antibiotic is very soluble in aqueous mineral acids, especially below pH 3, and is moderately soluble in basic media (above pH 10). It is less soluble in water at intermediate pH values and has a water-solubility of about 50 to about 100 mcg./ml. The crude antibiotic is relatively insoluble in lower aliphatic alcohols, such as methanol, ethanol, etc.

The distribution coefficients of the antibiotic in various solvent pairs are indicated below:

| Solvent pair: | K |
|---|---|
| n-Butanol: 0.01 N HCl | 0.9 |
| n-Butanol: 2% aqueous acetic acid | 1.0–1.2 |

The ultraviolet absorption spectrum in several solvents shows peaks at the following wavelengths:

TABLE III

| Solvent | Max. ($E_{1\,cm.}^{1\%}$) | Min. ($E_{1\,cm.}^{1\%}$) |
|---|---|---|
| 0.01 N NaOH in $H_2O$ | 273 (360)<br>357 (240) | 240 (150)<br>327 (200) |
| 0.1 N HCl in $H_2O$ | 275 (350)<br>350 (250) | 240 (170)<br>327 (220) |
| $H_2O$ | 273 (360)<br>353 (240) | 240 (150)<br>327 (210) |
| MeOH: HCl, .01 N | 277 (280)<br>317 (205) shoulder<br>355 (235) | 255 (170)<br>300 (200)<br>235 (200) |
| .01 M $CaCl_2$ in 0.01 N NaOH | 236 (310)<br>276 (315)<br>385 (230) | 250 (265)<br>335 (120) |

The stability of 2-acetyl-2-decarboxamidooxytetracycline in aqueous solution was determined as a function of pH and is expressed as half-life in the following table:

| pH: | Half-life, days |
|---|---|
| 2 | 12 |
| 5 | 14 |
| 7 | 3–4 |
| 9 | 2 |

The half-life of the antibiotic was calculated by periodic assay of the antibiotic activity of the solution employing B. cereus plate assay.

*Example II*

The following medium is prepared:

| | |
|---|---|
| Corn starch | g./l 75 |
| Corn steep liquor | g./l 25 |
| $CaCO_3$ | g./l 7 |
| $(NH_4)_2SO_4$ | g./l 5 |
| $NH_4Cl$ | g./l 1.5 |
| $MgCl_2$ | g./l 2 |
| $FeSO_4$ | g./l 0.04 |
| $MnSO_4$ | g./l 0.04 |
| $ZnSO_4$ | g./l 0.10 |
| $CoCl_2$ | g./l 0.005 |
| Soybean oil | ml 10 |
| Silicone oil (Dow-Corning Antifoam A) | g./gal 1 |

After sterilization the medium is inoculated with a growth of S. aureofaciens ATCC No. 13749 and fermentation is allowed to proceed for 5 days beneath the surface at a rate of 2 cubic feet per hour per gallon. The pH drops from an initial value of 6.3 to about 5.85 during this period. Beginning with the 84th hour samples of broth are withdrawn, filtered and tested in vitro against B. subtilis and S. aureus, producing inhibition zones 23 to 32 mm. in diameter.

At the conclusion the broth is filtered and the filtrate extracted, without pH adjustment, with 6 one-sixth volumes of methyl isobutyl ketone. A liter of the combined extracts is next concentrated to about 700 ml. and triturated with an equal volume of ether, causing a solid product to precipitate. 4 grams of this solid are dissolved in 250 ml. pH 3.5 MacIlvaine buffer for cellulose column partition chromatography.

Whatman ashless chromatographic cellulose powder is slurried with a solution of nitromethane (20), chloroform (10), and pyridine (3) and transferred to a column about 1½ inches in diameter and about 14 inches long. The buffer solution is slowly passed over this column by gravity, followed by additional aqueous buffer. Two liters of aqueous effluent are collected in a series of separate fractions, which are assayed by paper chromatography to select the fractions containing the desired product in substantially homogeneous state. These fractions are combined and concentrated, whereupon 30 mg. of red solid precipitates. A turbidity assay of this solid vs. K. pneumoniae indicates a potency of 13 units per milligram. The product melts at 90–140° C. with decomposition in this state of purification and is observed to be more than half crystalline by examination under the polarizing microscope. Ultraviolet light absorption spectra and paper chromatography studies indicate it to be 2-acetyl-2-decarboxamidotetracycline free base. After further purification by a second cellulose column partition chromatography step the product exhibits infrared absorption maxima at the following frequencies (1% in KBr pellet): 3390, 3260, 2900, 2835, 1775, 1647, 1620, 1608, 1592, 1580, 1500, 1460, 1443, 1397, 1361, 1347, 1303, 1260, 1234, 1220, 1143, 1102, 816, 799 and 738 cm.$^{-1}$. This infrared absorption spectrum is shown in FIG. 1.

2-acetyl-2-decarboxamidooxytetracycline and 2-acetyl-2-decarboxamidotetracycline, being amphoteric, form salts with both acids and bases. For example, the antibiotics form salts with both organic and inorganic acids, such as phosphoric, nitric, sulfuric, hydrochloric, tartaric, glycollic, citric, gluconic, malic, maleic, succinic, glutaric, acetic and benzoic acids, as well as with bases such as alkali metal and alkaline earth metal hydroxides. The salts of these antibiotics possess antimicrobial activity. The salts may be prepared by standard procedures well known in the art, such as reacting equivalent amount of the antibiotic and acid or base in a lower alkanol followed by addition of a non-solvent. After standing, the crystalline salt separates.

A preferred method of preparing 2-acetyl-2-decarboxamidooxytetracycline salts follows. The crude antibiotic, assaying at 50 oxytetracycline units/mg., is further purified, if desired, by counter-current distribution in one of several solvent systems (such as described above) employing from about 50–500 transfers, for example, using n-butanol: 0.01 N HCl. The antibiotic is isolated from the distribution by addition of 2 volumes of hexane per volume of butanol solution followed by lyophilization of resultant lower phase. The lyophilate is then crystallized from a minimum of isopropanol containing 5% concentrated hydrochloric acid by diluting the mixture with 10 volumes of ethyl acetate. Paper chromatographic examination of the hydrochloride demonstrated the presence of a single microbiologically active component. Bioassay of 2-acetyl-2-decarboxamidooxytetracycline hydrochloride by B. cereus plate assay showed an activity of 70–75 oxytetracycline units/mg. Ultraviolet absorption (in $H_2O$) of the hydrochloride is similar to that of the antibiotic, with the following absorption maxima:

$$275\ m\mu,\ E_{1\,cm.}^{1\%} = 410$$

and $$353\ m\mu,\ E_{1\,cm.}^{1\%} = 291$$

and a shoulder at $$313\ m\mu,\ E_{1\,cm.}^{1\%} = 255$$

Following treatment of the hydrochloride in $1N H_2SO_4$ at 100° for 10 minutes, the ultraviolet spectrum showed peaks at 220, 249, 273, 318 and 370 mμ.

2-acetyl-2-decarboxamidooxytetracycline hydrochloride, purified by counter-current distribution was dissolved in methanolic calcium chloride solution containing 5–6% aqueous hydrochloric acid. The crystalline compound which separated on slow addition of ethyl acetate deposited as anisotropic rectangular yellow plates, M. 196–200° C. (dec.) with prior darkening. Further purification raised the melting point to 201–203° C. This product, 2-acetyl-2-decarboxamidooxytetracycline hydrochloride, is homogeneous when examined in paper chromatographic systems described above. The ultraviolet absorption spectrum in aqueous solution shows two peaks, at $$273\ m\mu,\ E_{1\ cm.}^{1\%}=438$$

and at $$354\ m\mu,\ E_{1\ cm.}^{1\%}=310$$

A dried sample shows $[\alpha]_D^{25}=-46.6°$ in 0.1 N aqueous hydrochloric acid. Titration of the hydrochloride in aqueous solution gives $pK_a$ values of 3.3, 7.1 and 9.2 In a KBr pellet (1%), 2-acetyl-2-decarboxamidooxytetracycline hydrochloride exhibits characteristic absorption in the infrared region at the following frequencies expressed in reciprocal centimeters: 3311, 2959, 1695, 1637, 1618, 1587, 1462, 1376, 1335, 1300, 1241, 1212, 1176, 1145, 1121, 1099, 1066, 1054, 1017, 1002, 947, 928, 864, 842, 829, 774, 721 708 676. This infrared absorption spectrum is shown in FIG. 2. The absorption at 1695 cm.$^{-1}$ (5.92 m$\mu$) is believed due to the carbonyl group. Elemental analysis of the product which was dried at 80° C. for four hours at 0.05 mm. pressure, gave the following elemental analysis, C, 54.9%; H, 5.5%; N, 2.6%; Cl, 7.4%; and sulfated ash, 0.1%.

The sodium salts of 2-acetyl-2-decarboxamidooxytetracycline and 2-acetyl-2-decarboxyamidotetracycline are prepared by treating the antibiotic with sodium hydroxide in water until the pH is over 10. The solution is then frozen and dried under vacuum to yield the dry sodium salt in the form of a water soluble powder.

The calcium salts are also prepared employing this same procedure with calcium hydroxide in place of sodium hydroxide.

What is claimed is:

1. A compound selected from the group consisting of 2-acetyl-2-decarboxamidooxytetracycline and its acid and basic salts.
2. 2-acetyl-2-decarboxamidooxytetracycline.
3. The hydrochloride salt of the product of claim 2.
4. The sodium salt of the product of claim 2.
5. A process for producing 2-acetyl-2-decarboxamidooxytetracycline which comprises cultivating the microorganism *S. rimosus*, ATCC 13224, in an aqueous nutrient medium containing carbohydrate, organic nitrogen and inorganic salts, under submerged aerobic conditions until substantial antimicrobial activity is imparted to said medium.
6. A process as in claim 5 in which the tetracycline antibiotic is recovered from the fermentation broth.

No references cited.